United States Patent [19]

Naecker, Jr.

[11] Patent Number: 5,800,294
[45] Date of Patent: Sep. 1, 1998

[54] MOBILE HOOP HITCH

[76] Inventor: Charles A. Naecker, Jr., 911 Hollywood Ave., Silver Spring, Md. 20904

[21] Appl. No.: 821,543

[22] Filed: Mar. 21, 1997

[51] Int. Cl.[6] ................................................ A63B 63/08
[52] U.S. Cl. ........................ 473/481; 473/483; 211/13.1; 224/400; 224/488; 224/519
[58] Field of Search ........................ 473/481, 483, 473/100, 101; 211/13.1, 85.7, 85.18; 224/402, 488, 518, 519, 521, 400

[56] References Cited

U.S. PATENT DOCUMENTS

| | | |
|---|---|---|
| 4,461,410 | 7/1984 | Tartaglia .................... 224/519 |
| 4,789,156 | 12/1988 | D'Annunzio .................... 473/481 |
| 4,856,686 | 8/1989 | Workentine .................... 224/521 X |
| 5,100,132 | 3/1992 | Anderson et al. .................... 473/481 |
| 5,255,909 | 10/1993 | Wendell .................... 473/481 |
| 5,316,290 | 5/1994 | Parr et al. .................... 473/483 |
| 5,401,015 | 3/1995 | Woodall .................... 473/481 |
| 5,433,356 | 7/1995 | Russell .................... 224/519 |
| 5,458,389 | 10/1995 | Young .................... 224/521 X |
| 5,540,537 | 7/1996 | Welch .................... 224/521 X |
| 5,573,238 | 11/1996 | Aaron et al. .................... 473/483 |

Primary Examiner—Raleigh W. Chiu
Attorney, Agent, or Firm—Robert Halper

[57] ABSTRACT

A portable basketball goal assembly mounted on the hitch of a vehicle is readily disassembled, packaged and stored in or on the vehicle for transport.

8 Claims, 3 Drawing Sheets

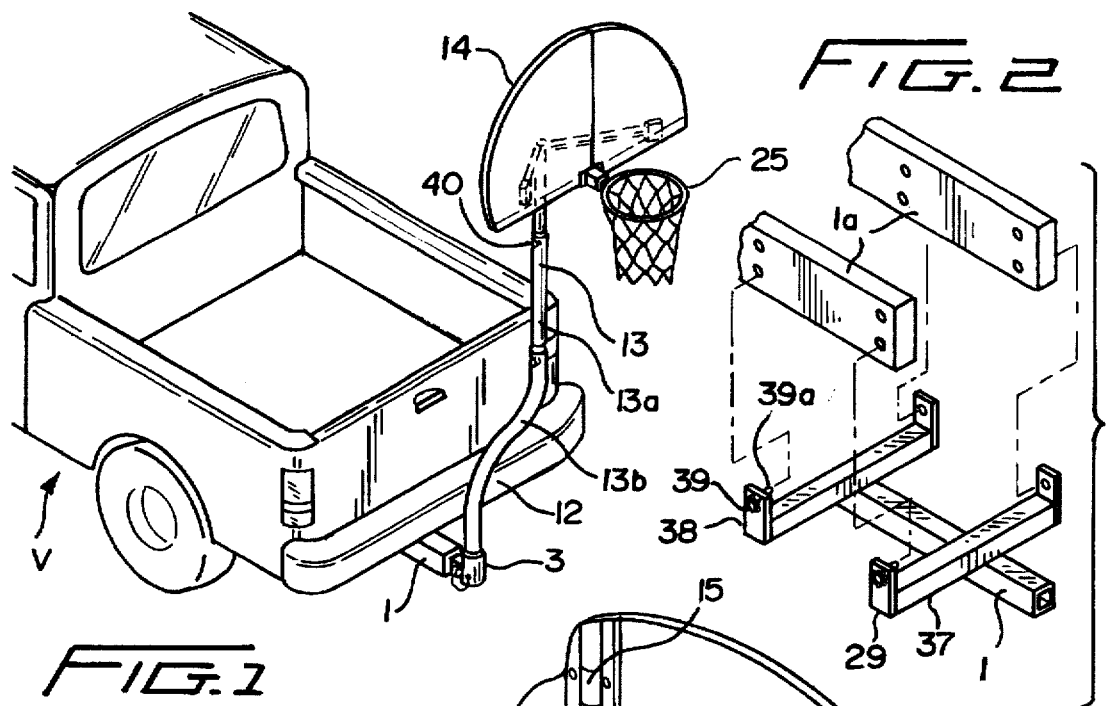
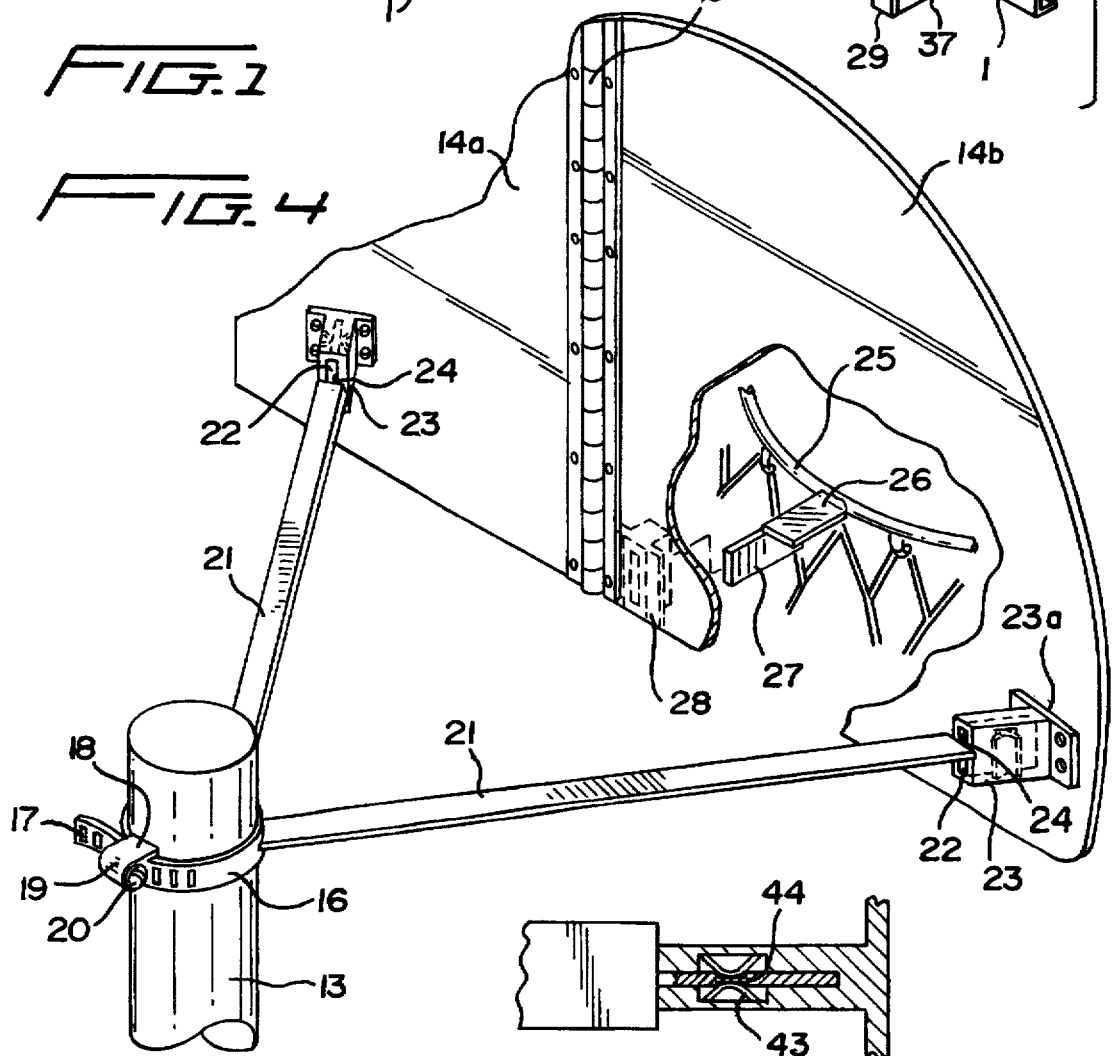

MOBILE HOOP HITCH

FIELD OF INVENTION

This invention pertains to a portable basketball assembly erected on the hitch of a vehicle, which can be readily dismantled, packaged and stored in or on the vehicle.

BACKGROUND OF THE INVENTION

There are a number of portable basketball devices and there are a number of arrangements on vehicles for carrying equipment of various types such as bicycles. As for the basketball assemblies the majority have very limited portability. On the other hand most of the equipment carried by vehicles has little to do with basketball. In the case where the portable basketball assembly is mounted for long distances, the mounting is so constructed as to take up a lot of storage space on the vehicle.

Illustrative of the prior art devices pertinent to this invention are:

U.S. Pat. No. 3,716,234 teaches a collapsible basketball goal having a backboard made of two pivoted sections, where the backboard is mounted on a collapsible tubular upright support, which in turn is mounted to an anchor shoe in the base by hinge couplings.

U.S. Pat. No. 4,461,410 teaches a carrying rack for bicycles wherein the rack is attached to an automobile trailer hitch tongue and means are provided for fastening the bicycle rack to the tongue of the trailer hitch.

U.S. Pat. No. 5,149,086 teaches a poolside basketball game which uses a portable basketball backboard Everything is in kit form so that the producer can mount, support, adjust and fit all the component parts at the pool site on a pool rail of any size.

U.S. Pat. No. 5,158,281 shows another portable basketball goal assembly including an anchor, a goal post, a backboard and basket. The anchor could be an industrial drum or rain barrel which can enable the storage of a volume of water or other substances. The portability of the assembly is a function of the mass which may be varied. Mass can be added or diminished by use of a stoplock at the bottom of the barrel to discharge some mass.

U.S. Pat. No. 5,316,290 shows a portable basketball goal assembly having a collapsible backboard and goal. The base is mounted in the back of a pickup truck A rotatable first support member is attached to the base and a rotatable second support member is attached to the first member. A rotatable backboard and goal is attached to the second support member The two supports, backboard and goal are all rotatable relative to the base and can be collapsed into a flat, compact package in the pickup truck for storage and transport. Braces are used to hold the first and second support members in upright assembled positions. A second brace is used to hold the backboard and goal at the desired positions for use.

U.S. Pat. No. 5,354, 049 teaches an apparatus and method for packaging a portable basketball goal system. The system comprises a pole, a backboard, a goal and a hollow ballast receiving base. All of the members can be stiored in the base and the total unit can be placed in a flat container to assist shipping.

U.S. Pat. No. 5,423,566 teaches an adjustable trailer hitch. A wedge shaped section is located near the top rear portion of a trailer hitch insert tube. The wedge shaped section is located opposite a complementary shaped section of the insert tube. The wedge shaped section engages the insert tube to reduce movement of a trailer hitch insert tube within a trialer hitch tube attached to a vehicle.

It is therefore an object of this invention to mount a basketball assembly in such a way that it can be transported and readied for use in any area.

It is a further object of this invention to provide a portsble basketball assembly which is moubted on the hitch of any type vehicle.

It is also an object of this invention to provide a portable basketball assembly which is collapsible and readily packaged for storage and transport.

SUMMARY OF THE INVENTION

The invention is directed to a portable basketball assembly which includes telescopic post sections, and a first bent section which is inserted into an upright cylindrical member welded to a rectangular bar which fits within a tubular member that is fastened to the under side of a frame bolted to the vehicle chassis. When assembled for play a first post section slides into the cylinder and locked in place. Successive sections are telescopically extended until the desired height is reached. A hinged backboard is is unfolded and connected to the end post section by a collar fitted over the post section. A pair of braces inclined outwardly from the collar are detachably secured to the back side of the backboard. A goal is similarly detachably secured to the front of the backboard. When finished playing, the straight post sections are removed from the first section and telescopically compacted after the post section attached to the backboard has been detached therefrom. The first section is released from the welded cylindrical member and the goal is detached from the backboard. The post sections including the bent section are placed in a hinged casing with the backboard placed over the sections and the goal with the rim laid over the backboard. The casing is closed and securely stored in or on the vehicle.

BRIEF DESCRIPTION OF THE DRAWINGS

FIG. 1 is a perspective view of the assembled basketball assembly fastened to the hitch of a vehicle.

FIG. 2 is a view showing a bracket mounted to the chassis for supporting a trialer hitch tube.

FIG. 4 is a an enlarged view showing the connection of the backboard to one of the post sections and the connection of the goal to the backboard.

FIG. 5 is a section taken on line 4-4 of FIG. 4 showing fastening of a brace to the backboard.

DETAILED DESCRIPTION OF THE INVENTION

Figure 3:
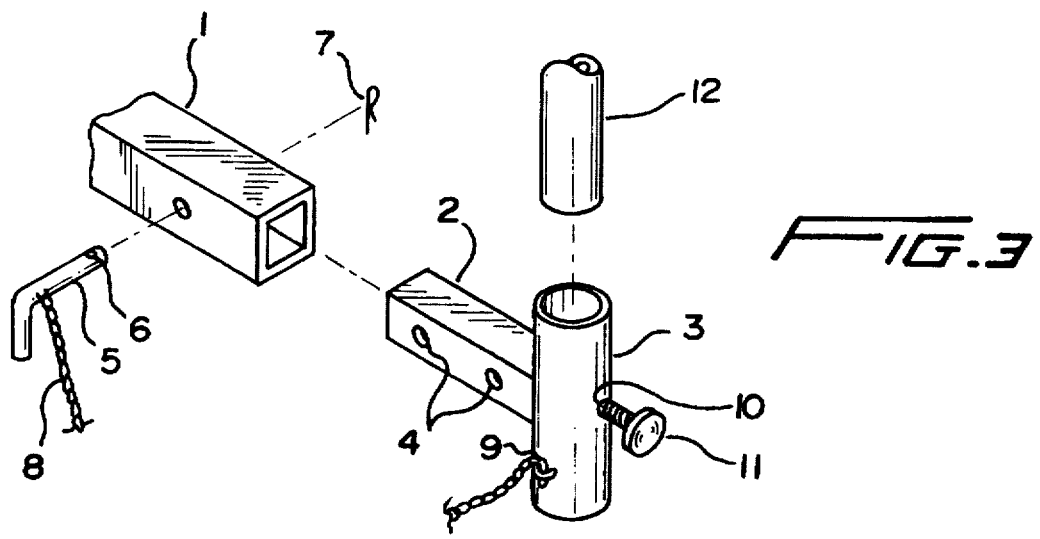
FIG. 3 is an enlarged view showing the attachment of the hitch bar and upright column to the hitch tube.
Figure 6:
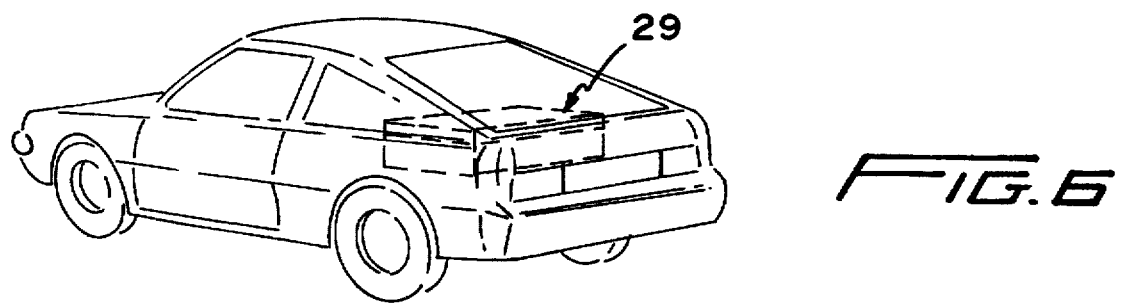
FIG. 6 is a view showing the assembly packaged and stored in a vehicle.
Figure 7:
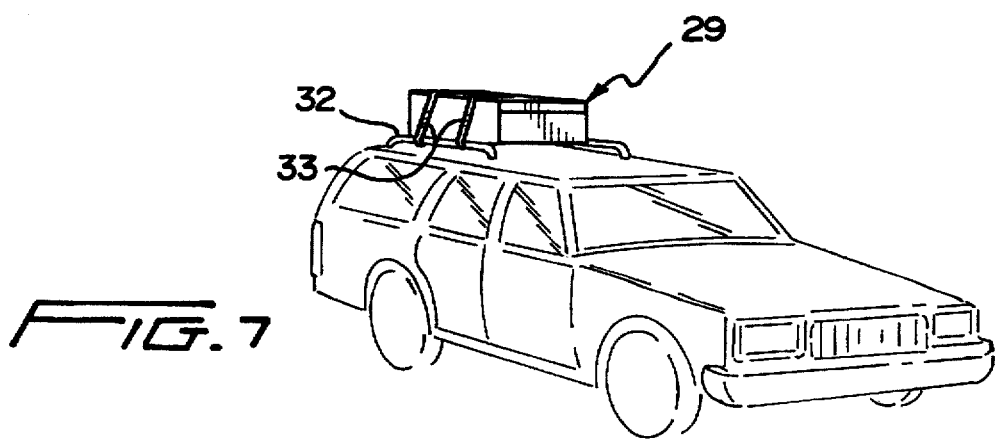
FIG. 7 is a view showing the assembly packaged and stored on a vehicle.
Figure 8:
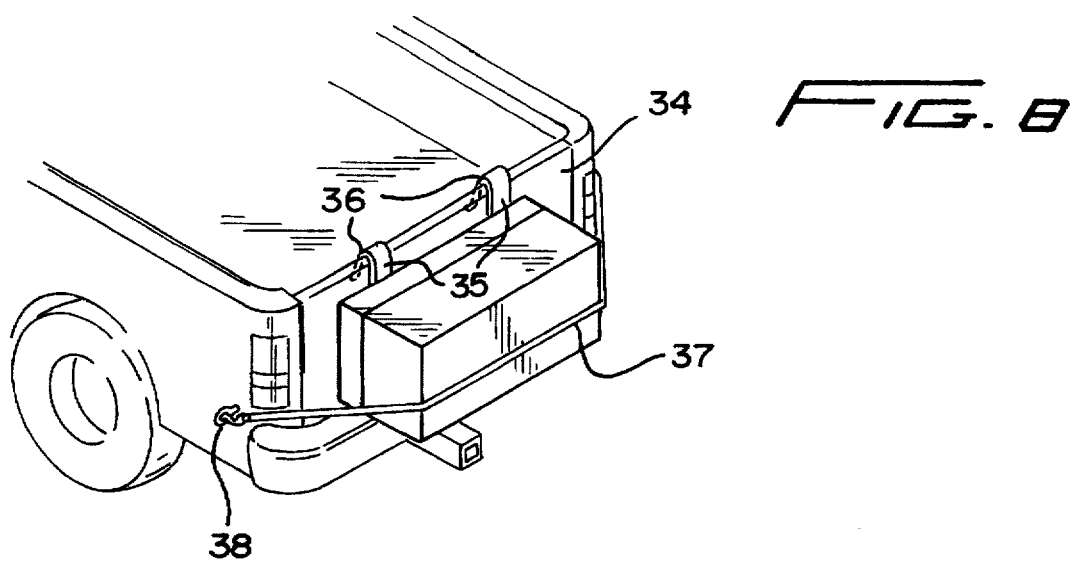
FIG. 8 is an end view showing another embodiment of the assembly packaged and stored on a vehicle
Figure 9:
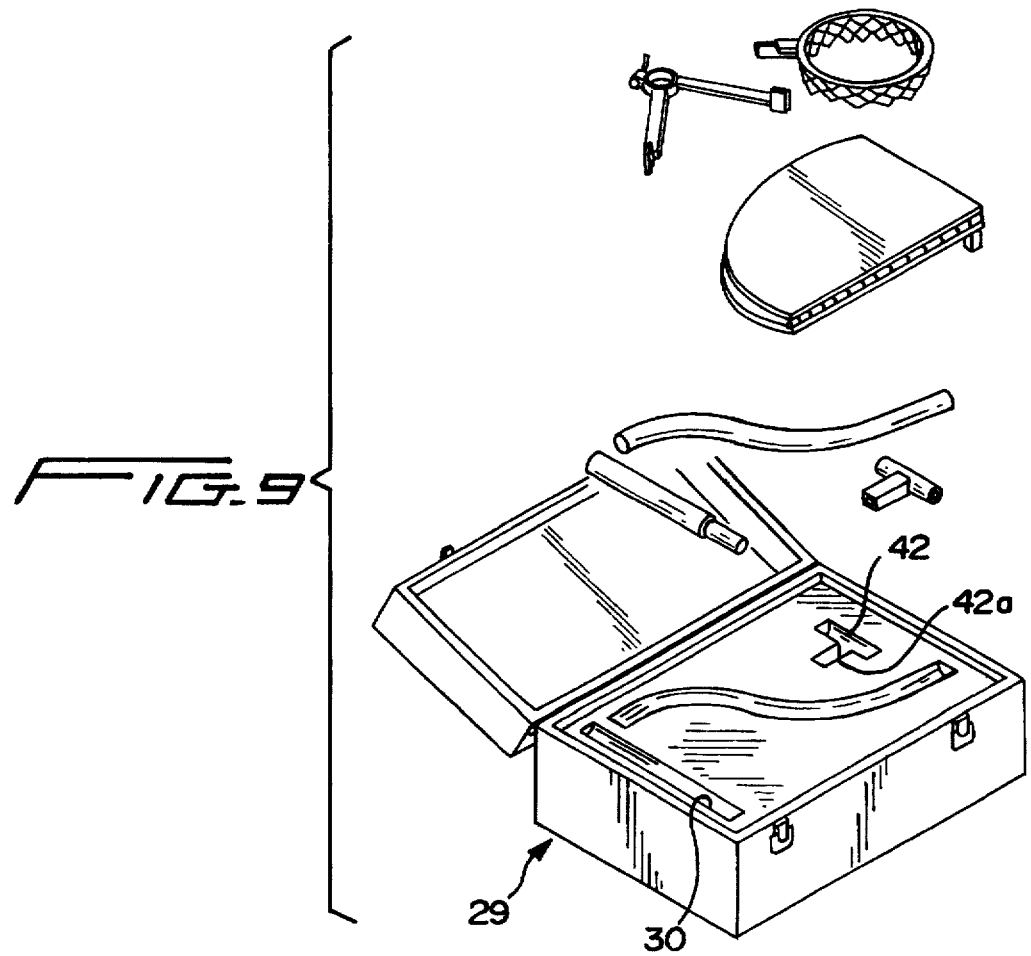
FIG. 9 is a plan view of the opened casing ready for packaging.

FIGS. 1 and 2 show a vehicle V having a trailer hitch rectangular tube 1 welded to the underside of a bracket 2a bolted to the chassis 1a. The bracket comprises a pair of spaced horizontal legs 37 which extend across the width of the chassis. Welded to the ends of these legs are flat plates 38 which run adjacent outer sides of the chassis. The plates have perforations 39 through which pass bolts 39a for fastening the brackets to the outer sides of the chassis. The tube 1 is medially positioned with respect to the sides of the vehicle on the bracket and extends rearwardly to a point slightly outward from the rear of the vehicle. As seen in FIG. 3, a rectangular bar 2 about 2 feet long is welded to an upright column 3 which is about a foot and a half long. The rectangular bar has 2 spaced perforations 4 on the lateral sides of the bar. These perforations correspond to similar perforation on the hitch tube. The bar 2 can be adjustably inserted into the hitch tube 1 so that at least one set of perforations is aligned and fastened by an L shaped key 5 inserted into one set of perforations. Near the straight end of the key is a small hole 6 for insertion of a cotter pin 7 or the like. The other end of the key having the L shape serves as a handle for manipulating the key. A chain 8 is welded to the key on a straight portion adjacent the handle and its loose end is attached to a hook 9 that is fastened at a convenient location on the upright column. On the side of the column opposite the rectangular bar is a threaded opening 10 for a cap screw 11. An elongate bent post section 12 is placed in the column and locked by turning the cap screw to bear against the post section. Post section 12 has two vertical offset parallel segments separated by an inclined segment that is designed so that the game is played about 2 feet away from the vehicle. Fitted into the section 12 are a plurality of vertical telescopic sections 13, each about 3 feet long, that will extend the height to the proper distance for mounting of a backboard 14. While the telescopic sections fit snugly into each other, to obviate any possible rotary movement,. each respective section will have at its point of juncture either a male or female connection. For example a section 13a that fits into a corresponding section 13b will have a spring activated nipple 40, whereas section 13b will have a corresponding peforation 41 to receive the nipple. The backboard is made in two equal units 14a, 14b which are connected by a hinge 15 that extends longitudinally across each unit. Over the uppermost telescopic post section is placed a strap 16 of the type similar to that used on pressure hoses. The strap has a series of slots 17 spaced along a section of its circumference. A channel 18 extends tightly around the underside of the strap, and forwardly of the strap as seen from a top view, the channel is joined to a semicircular housing 19 for a screw 20 whose threads engage the slots and enable loosening or tightening of the strap around the post section. Welded to the distal side of the strap away from the location of the slots are a pair of braces 21 that extend angularly and outwardly from the strap. Each brace carries a welded shoe 22 whose width is perpendicular to the width of the brace The shoe fits into a tee shaped member 23 having a slot 24 in the web of the tee. The flange 23a of the tee is bolted to the rear of the backboard The shoe is locked in the slot by a pair of spring strips 43 which are mounted on each side of the slot and which are compressed when the shoe is pushed through the slot. Once the shoe has extended completely through the slot, the spring strips snap back into indented regions 44 in the shoe. Similarly at disassembly, to release the shoe from the slot the shoe is pulled forwardly. On the front of the backboard there is a rim 25 for the goal. An extension in the form of an angle 26 is attached to the underside of the rim. The foremost part of the angle with respect to the part attached to the rim has its horizontal flange removed so that its vertical leg 27 similar to the shoe on the rear side fits into another tee 23 having a slot 24 in its web the flange 23a bolted to the front side of the backboard and locking means in the form of spring clips as described above. In disassembling the unit for packaging and storage, the vertical leg of the angle attached to the rim of the goal is slipped out of its slot. The strap is disengaged from its post section and the braces are released from their respective slots. The telescopic sections are collapsed and separated from the bent section and the cap screw in the column is loosened to remove the bent section. The entire assembly is packed in a hinged casing 29. The casing has a groove 30 running transversely along one side of its floor for storing the telescopic sections and a smaller parallel groove 42 with a perpendicular extension 42a in its medial region on the other side of the floor. These grooves are for storing the upright column and rectangular bar. An angular groove 31 shaped in conformity with the bent section occupies substantially the width and length of the casing extending from a point adjacent the transverse groove 30 and ending at a location below groove 42. After placement of the telescopic sections, the bent post sections and the upright column with the hitch bar in the casing, the back board is folded over and placed on top of the post sections, followed by the strap with attached braces and then the rim. The casing is then closed and stored in a convenient location such as the rear of the vehicle or in the trunk. Alternatively in the case where the vehicle has a rack fixed on the roof, the casing can be fastened on the rack 32 with straps 33 or if the vehicle is a truck, the casing can be suspended over the tailgate 34 by a pair of ski like resilient fiber board members 35 adhesively fastened to the casing. The members are curved at one end to form a cusp 36 that snaps over the tail gate. To keep the lower end of the casing from swinging when the vehicle is in motion. An elastic cord 37 is passed around the lower end of the casing The ends of the cord are looped over stubs 38 welded to the outer sides of the truck.

As an added feature for those who would welcome an opportunity to play basketball in the evening, a light or a plurality of spaced lights could be mounted in a light holder affixed to the backboard with appropriate wiring from the light holder to a generator located in the vehicle.

Although the invention describes a particular embodiment of the invention, it should be understood that various changes, variations and modifications can be made as would be obvious to those skilled in the art without departing from the spirit of the invention as reflected by the scope of the claims.

I claim:

1. A vehicle having a combination of a portable basketball assembly and a vehicle hitch, said assembly being mounted on said hitch comprising:

a) a chassis and a rectangular tube welded to an underside of a pair of spaced brackets bolted to the outer sides of said chassis said tube having spaced perforations, a bar having corresponding perforations that fits into said tube, an L-shaped key having a hole on its straight end that locks said bar in one of said perforations, a cotter pin inserted in said hole, a chain affixed to said key on said straight end adjacent said L a short length of an upright column welded to said bar, a hook mounted on said column, a loose end of said chain secured to said hook, b) a threaded opening on said column opposite the location of said bar and a cap screw that fits into said threaded opening, a first bent post section having a vertical piece that fits into said column and is secured by said screw, a plurality of telescopic post sections including one section mounted in said first bent post section and a last section, c) a backboard and means for fastening a rear side of said backboard to said last section, said backboard having two equal sections attached by a longitudinal hinge on its back side, a rim of a goal and second means for fastening said rim to a front side of said backboard, d) a closed casing, said basketball goal assembly being readily disassembled and packaged in said closed casing that is stored in or on said vehicle for transport.

2. The basketball goal assembly of claim 1 wherein said means for fastening said last post section to a back side of said backboard includes a strap placed over said last post section, said strap having a circumferential length with a plurality of spaced transverse slots located along a part of said circumferential length, a channel embracing an underside of said strap in the region of said slots, said channel being joined by a semicircular housing forwardly of said strap, a screw in said housing that meshes with said slots for adjustably fastening said strap around said post section, a pair of wide angled braces extending outwardly from a side of the strap away from said slots, said braces having shoes whose width is oriented perpendicular to the width of the braces, said shoes fitting into slots in webs of tee shaped members, said tee shaped members having flanges bolted to said rear side of said backboard, said tee shaped members having a pair of spring strips affixed to the sides of the slots, said spring strips being compressed when said shoes are pushed through said slots, said spring strips locking said shoes in said slots after compleltely passing through said slots.

3. The basketball assembly of claim 2 wherein said second means for fastening said rim to a front side of said backboard includes an angle having a horizontal leg welded to said rim and a vertical leg with a front portion of its horizontal leg removed, said vertical leg fitting into a slot in a web of a tee, said tee having a flange bolted to the front side of said backboard, said slot having a pair of spring clips on each side of said slot to secure and release said vertical leg of said angle.

4. The basketball assembly of claim 3 wherein said casing for receiving said disassembled basketball goal assembly includes a floor portion hinged to a cover portion, said floor includes a groove transverse to the length of said casing and located near one end thereof for receiving said telescopic post sections, a bent groove shaped to receive said first post section and positioned perpendicular to said transverse groove, one end of said groove being adjacent said transverse groove, another end of said groove being close to the end of said casing, a second smaller groove parallel to said transverse groove having a grooved perpendicular extension in the medial refion of said smaller groove, one end of said smaller groove being above said end of said bent groove adjacent said casing, said smaller grooves receiving said upright column and hitch bar, said floor and cover portion being of a depth to accommodate said rim and attached angle placed over said post sections with said strap and said braces placed over said rim.

5. The basketball assembly of claim 4 wherein said closed casing is to be stored at a convenient location in said vehicle.

6. The basketball assembly of claim 4 wherein said closing is to be stored on a roof of said vehicle.

7. The basketball assembly of claim 4 wherein said vehicle is a truck and said closed casing is to be stored on a tailgate of said truck.

8. The basketball goal assembly of claim 7 wherein said cover of said casing has a pair of spaced resilient ski like members adhesively fastened to an outer side of said casing, said members having a cusp at one end, said cusp snapping over said tailgate for suspending said casing and an elastic cord having looped ends extending around a lower section of said casing, said loops being affixed over stubs on outer sides of said truck.

* * * * *